United States Patent
DeRoller

(10) Patent No.: US 9,037,537 B2
(45) Date of Patent: May 19, 2015

(54) AUTOMATIC REDACTION OF CONTENT FOR ALTERNATE REVIEWERS IN DOCUMENT WORKFLOW SOLUTIONS

(71) Applicant: Xerox Corporation, Norwalk, CT (US)

(72) Inventor: Matthew DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 244 days.

(21) Appl. No.: 13/865,655

(22) Filed: Apr. 18, 2013

(65) Prior Publication Data

US 2014/0317049 A1    Oct. 23, 2014

(51) Int. Cl.
*G06F 17/00* (2006.01)
*G06F 17/30* (2006.01)

(52) U.S. Cl.
CPC ............... *G06F 17/30011* (2013.01)

(58) Field of Classification Search
CPC ................................. G06F 17/30011
USPC ........................................ 707/608
See application file for complete search history.

(56) References Cited

U.S. PATENT DOCUMENTS

| | | | | |
|---|---|---|---|---|
| 6,003,011 | A * | 12/1999 | Sarin et al. | 705/7.26 |
| 6,088,679 | A * | 7/2000 | Barkley | 705/7.26 |
| 6,115,640 | A * | 9/2000 | Tarumi | 700/99 |
| 6,859,823 | B1 * | 2/2005 | Nishihara et al. | 709/217 |
| 7,191,392 | B1 * | 3/2007 | Coar | 715/234 |
| 7,302,483 | B1 * | 11/2007 | Carbone et al. | 709/225 |
| 7,379,945 | B1 * | 5/2008 | Hirsch et al. | 1/1 |
| 7,472,341 | B2 * | 12/2008 | Albornoz et al. | 715/230 |
| 7,644,073 | B2 | 1/2010 | Golovchinsky et al. | |
| 7,707,642 | B1 * | 4/2010 | Herbach et al. | 726/27 |
| 7,774,504 | B2 * | 8/2010 | Chen et al. | 709/246 |
| 7,805,673 | B2 * | 9/2010 | der Quaeler et al. | 715/255 |
| 8,095,411 | B2 | 1/2012 | Beringer et al. | |
| 8,185,587 | B2 | 5/2012 | Dudley | |
| 8,195,483 | B2 * | 6/2012 | Maresh et al. | 705/3 |

(Continued)

OTHER PUBLICATIONS

Liu, Duen-Ren, et al., "Role-based authorizations for workflow systems in support of task-based separation of duty", The Journal of Systems and Software, vol. 73, © 2004, pp. 375-387.*

(Continued)

*Primary Examiner* — Robert Stevens
(74) *Attorney, Agent, or Firm* — Fox Rothschild LLP

(57) ABSTRACT

A document workflow management system monitors progress of a document as it moves between various personnel to whom workflow actions have been assigned. It may send the document to the alternate person and then return the document to the original workflow when the alternate person has completed the action. If the document includes content that is subject to an access restriction, it will automatically redact that content before sending it to the alternate person, and it may return the content to the document when the document returns to the original workflow.

20 Claims, 6 Drawing Sheets

(56) References Cited

U.S. PATENT DOCUMENTS

| | | | |
|---|---|---|---|
| 2002/0188638 A1* | 12/2002 | Hamscher | 707/530 |
| 2004/0064353 A1* | 4/2004 | Kim et al. | 705/8 |
| 2004/0205572 A1* | 10/2004 | Fields et al. | 715/513 |
| 2006/0069599 A1* | 3/2006 | Hatoun et al. | 705/8 |
| 2006/0215224 A1* | 9/2006 | Matsumoto | 358/1.18 |
| 2009/0235182 A1* | 9/2009 | Kagawa et al. | 715/753 |
| 2009/0260021 A1* | 10/2009 | Haenel et al. | 719/328 |
| 2009/0320088 A1* | 12/2009 | Gill et al. | 726/1 |
| 2010/0195152 A1* | 8/2010 | Tokumaru | 358/1.15 |
| 2011/0119102 A1* | 5/2011 | Horn et al. | 705/7.13 |
| 2011/0154180 A1 | 6/2011 | Evanitsky et al. | |
| 2011/0184843 A1* | 7/2011 | Orttung et al. | 705/34 |
| 2011/0209053 A1* | 8/2011 | Stronger et al. | 715/255 |
| 2011/0247081 A1* | 10/2011 | Shelton | 726/28 |
| 2012/0030122 A1* | 2/2012 | Rahaman et al. | 705/301 |

OTHER PUBLICATIONS

Du, Timothy C., et al., "Document access control in organizational workflows", Int. J. Information and Computer Security, vol. 1, No. 4, Inderscience Enterprises Ltd., © 2007, pp. 437-454.*

Georgiados, Christos K., et al., "Flexible Team-Based Access Control Using Contexts", SACMAT '01, Chantilly, VA, May 3-4, 2001, pp. 21-27.*

Porat, Sara, et al., "Dynamic masking of application displays using OCR technologies", IBM J. Res. & Dev., vol. 53, No. 6, Paper 10, © 2009, 14 pages.*

* cited by examiner

AUTOMATIC REDACTION OF CONTENT FOR ALTERNATE REVIEWERS IN DOCUMENT WORKFLOW SOLUTIONS

BACKGROUND

Workflows are business processes that are designed to achieve a specific purpose. They can be carried out by a single person or piece of equipment, a group, or a whole organization. In the context of document management, one type of workflow is a process by which one or more physical or electronic documents flow among people and/or groups or people for review, editing or other actions. This typically involves documents being distributed with different people responsible for creating, updating, reviewing, and approving the document.

When one or more people who are assigned a task in a document workflow are not responding quickly, those individuals can create bottlenecks in the workflow. In such a situation, an alternate person may be available to perform the task. However, if the content of the document is sensitive or confidential, then the disclosure of the document to the alternate person may not be permitted. Thus, the alternate reviewer may not be able to resolve the bottleneck.

This document describes systems and methods that present solutions to the problems discussed above, and which may also provide additional benefits.

SUMMARY

In an embodiment, a method for managing a document workflow comprises, by one or more processors, accessing a document workflow file. The document workflow file represents a document management workflow for a document and comprises information identifying workflow action personnel, and for each of the personnel, an action that is to be taken. The file also comprises a sequence pursuant to which the identified personnel are to take the actions. The method includes monitoring user status information for at least a portion of the workflow action personnel, determining that a condition exists that requires modifying the sequence by routing the document to an alternate person instead of one of the identified workflow action personnel, determining whether the document includes any information having an access restriction, and determining whether the access restriction applies to the alternate person. If the access restriction applies to the alternate person, the method includes modifying the document to yield a modified document that does not reveal the information, and causing the modified document to be routed to the alternate person.

Optionally, after causing the modified document to be routed to the alternate person, the method includes selecting, based on the workflow, one of the workflow action personnel who is to perform a next action, and causing the document, in a form that reveals the information, to be transmitted to the selected person to perform the next action.

In some embodiments, the method also includes receiving an indication that the alternate person has performed the action on the document, analyzing the document to determine whether the action has been properly completed, and causing the document to be sent to a next person to perform a next action only if the action has been properly completed. Otherwise, the method may return the document to the alternate person for re-performance of the action.

Before causing the modified document to be routed to the alternate person, the method may include sending an alert to an approver, wherein the alert identifies the alternate person. If so, it may cause the modified document to be routed to the alternate person only after approval is received from the approver. The alert may include an indicator that the information having the access restriction has been removed from the modified document.

Optionally, determining whether the document includes information having an access restriction includes determining, based on a document template, whether the document includes a field for which the template associates the field with the access restriction, and if so, determining whether the document includes any content for the field. Alternatively, determining whether the document includes information having an access restriction includes using optical character recognition to identify content in the document, and determining whether the identified content has a format that satisfies a format criterion that corresponds to the access restriction.

Modifying the document may include, for example, redacting the information so that the information does not appear in a displayed version of the modified document.

Any of the steps may be implemented by a system that includes one or more processors, and instructions that are configured to instruct the processors to perform the steps when executed.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

As used in this document, the term "electronic device" refers to a device that includes a processor and tangible, computer-readable memory. The memory may contain programming instructions that, when executed by the processor, cause the device to perform one or more operations according to the programming instructions. Examples of electronic devices include personal computers, gaming systems, televisions, and portable electronic devices such as smartphones, personal digital assistants, cameras, tablet computers, laptop computers, media players and the like. The term "electronic communication" refers to the ability to transmit data via one or more signals between two or more electronic devices, whether through a wired or wireless network, and whether directly or indirectly via one or more intermediary devices.

As used in this document, the term "workflow" refers to a group of services that are performed in a sequence. For example, a document workflow may be a sequence of steps via which an electronic or physical document is routed to multiple users, each of whom performs a task on the document such as creating context updating, reviewing or approving.

Figure 1:
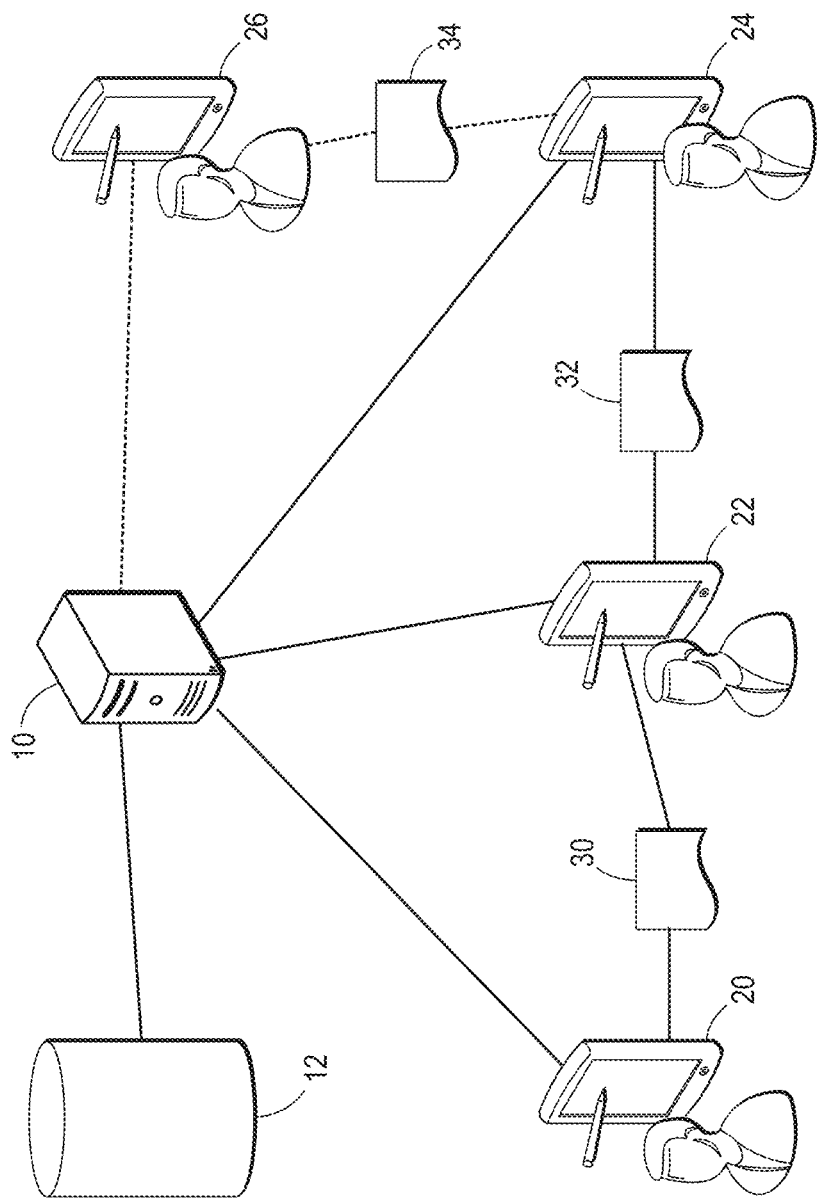
FIG. 1 illustrates various elements that may be included in a system that implements a document workflow.

FIG. 1 illustrates various elements that may be included in a system that implements a document workflow. The system includes a processing device 10 such as a network server that coordinates the workflow and monitors the progress of the workflow as the document passes through the system. The processing device 10 is in electronic communication with one or more data storage facilities 12 such a database or databases that contain document files and workflow files. Document files will be files containing data for an electronic document, such as a word processing document, a spreadsheet, a presentation, a chart, a media file such as one or more photos or videos, a graphic element or set of graphic elements, or any other document. A workflow file will be a file that contains electronic data with one or more instructions or parameters for routing the document file to various document management personnel for creation, modification, review and/or approval of the document. Each workflow file will be associated with one or more document files. A workflow file may be a data structure that is separate from the document file, or it may be integral with the document file, such as in metadata.

The system will include various electronic devices that are used by workflow action personnel. The workflow file may contain identification data for the personnel, such as a username, employee identification code and/or access code. Or, the workflow file may identify each workflow action person based on a network address or an identification code of an electronic device that the person uses. For example, the workflow file may include rules and/or parameters that are established by or set for a first workflow action person 20 who performs a first workflow action on the document. The first workflow action may include, for example, using a first electronic device to create a first draft of the document from a template. The workflow file may then require that the document 30 be sent to a second workflow action person 22 for a second workflow action, such as content addition, review and/or edit actions. The second person 22 may create a revised document 32 and transmit it to a third workflow action person 24 for a third workflow action, such as approval.

If one of the reviewers, such as the second person 22, is unavailable or not responding to a request to take action on the document, then to avoid delays in the workflow the server 10 may cause the document to be sent to an alternate person 26 to perform the second workflow action. The alternate person 26 may take an action such as creating a revised document 34 and transmitting it to the third workflow action person 24 for the third workflow action. The server may apply any of various rules for sending the document to the alternate person, such as those that will be described below.

Although FIG. 1 illustrates a system that includes three originally-assigned workflow action personnel and one alternate person, the embodiments disclosed in this document are intended to include systems that involve any number of original and/or alternate personnel.

Figure 2:
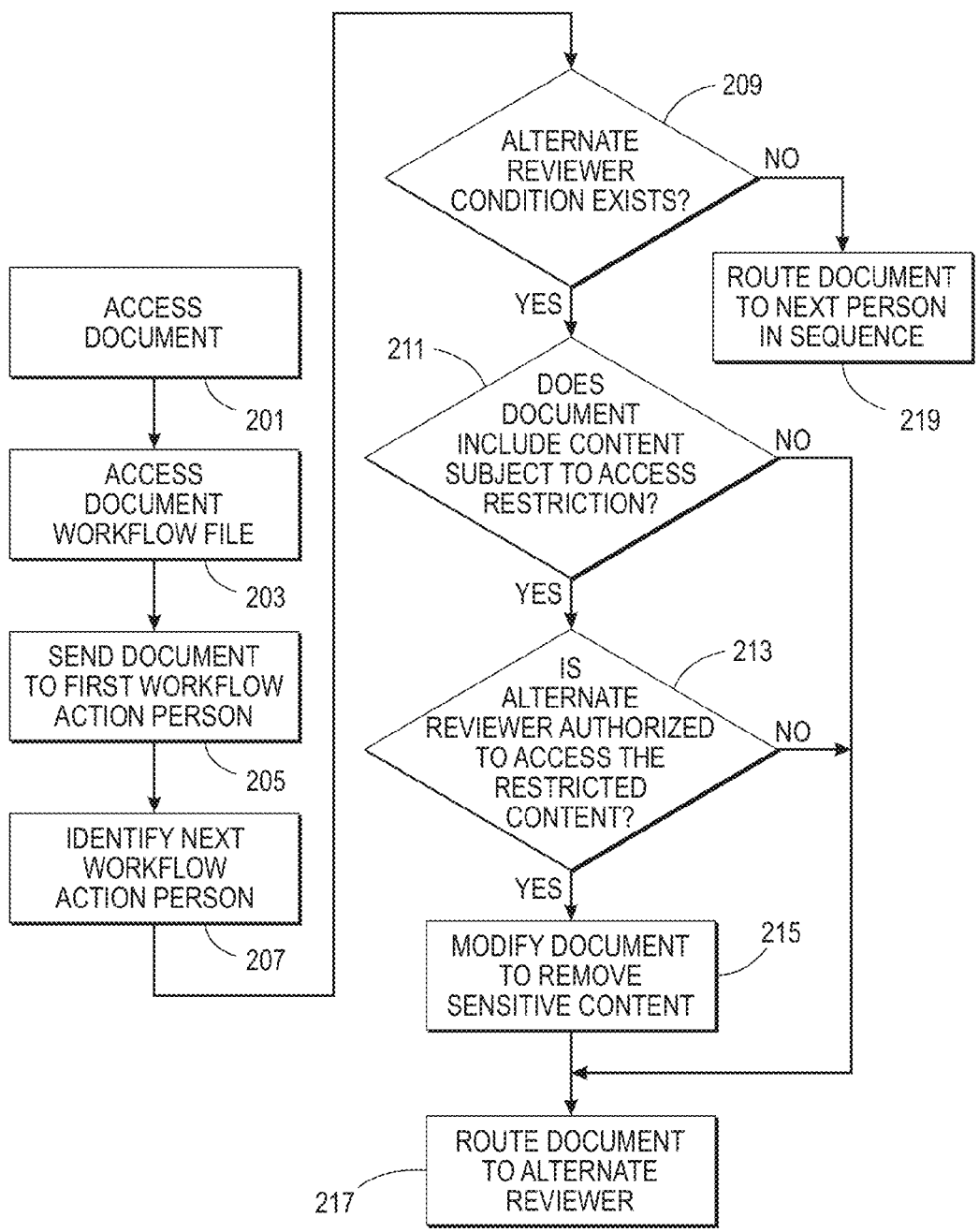
FIG. 2 is a flowchart that illustrates various rules and actions that a document workflow management system may implement.

FIG. 2 is a flowchart that illustrates various rules and actions that the workflow management system may implement. The system may begin by accessing an electronic document file 201 and a document workflow file 203 with which the document is associated. The document workflow file represents a document management workflow for the document. It may include rules and/or parameters that identify workflow action personnel to whom the document should be routed, as well as one or more actions to be taken by each of the personnel. The accessing of the workflow file may be performed by an administrative or hub electronic device (such as server 10 of FIG. 1) and/or by one or more of the workflow action personnel electronic devices. In this document, any such device that performs the described actions may be referred to as a "processor."

The processor may monitor progress of the document as it moves from person to person in the workflow. For example, the processor may send the document to (or monitor creation document of the document by) a first person 205. The first person will be the first person in a sequence who is required to perform one or more workflow actions on the document according to the workflow. After the first person has completed his or her action, the central processor and/or the first person's electronic device may identify, based on the rules and/or parameters in the workflow action file, the next person in the sequence to whom the document is to transmitted for a second action 207. Sending the document from person to person may occur by actual delivery of the document, by digital transmission of the document such as by email or messaging, or by sending each person an alert that the document may be viewed from a central location, such as via a browser that is used to access a cloud computing-based document management system.

The system may then monitor progress of the workflow, and it may determine whether a condition exists that requires routing the document to an alternate person rather than the next person in the workflow 209. As an example of such a condition, the system may determine a current status for the next person in the workflow's action sequence by retrieving status information from the person's calendar application. If the person's calendar application indicates that the person is out of the office, or that the person is busy (e.g., has one or more calendar appointments scheduled for all or a threshold portion of the time before which the person's workflow action is due), the system may consider such the person's status to be a condition requiring routing to an alternate approver. Other conditions may be established by programming rules, such as: (i) rules that assess the person's current workload level and determine that the condition exists if the workload level exceeds a threshold; (ii) rules that assess the location or time zone where the person is located and determine that the condition exists if the person is outside of a required location or time zone; or (iii) other rules and conditions.

If no such condition exists, the system will send the document to the next person in the workflow sequence 219 to perform the next action. However, if the condition exists, the system will determine whether the document includes any content that is subject to an access restriction 211. An access restriction may exist if the document includes sensitive content such as that subject to a legal, contractual or moral obligation of confidentiality or privacy. Examples of such content includes, without limitation, employee salary information, a person's Social Security Number, a person's financial account number, medical records, proprietary business information such as pricing information or trade secrets, and similar data. If an access restriction exists, then the system may only make the restricted content available to authorized persons, and not to unauthorized persons.

Figure 3:
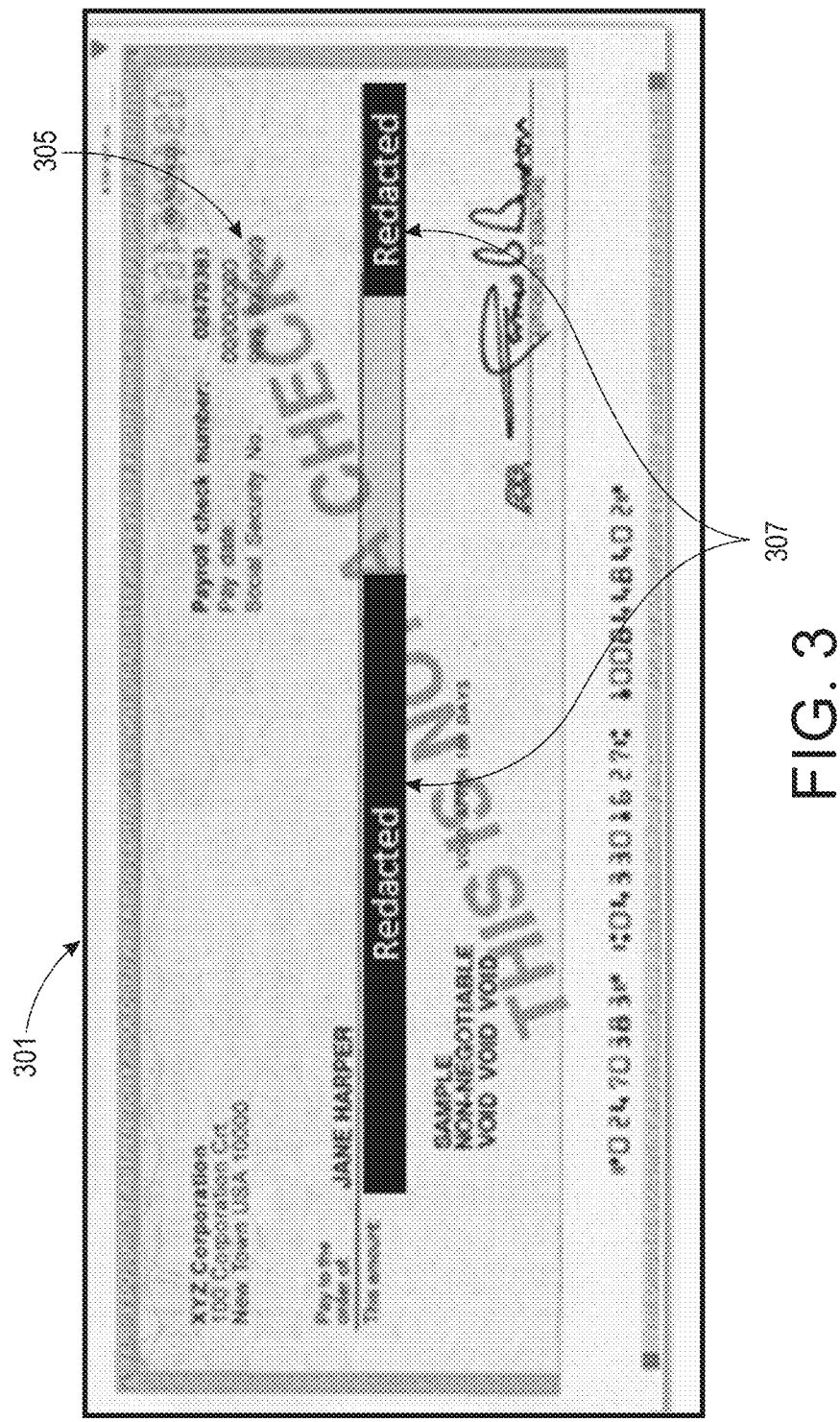
FIG. 3 illustrates various sources of status information for a workflow action.

In some embodiments, where the document includes a template with certain data fields and corresponding data, to determine whether the document includes any content with an access restriction the system may determine (a) whether the document includes a field for which the template associates the field with an access restriction, and (b) if so, whether the field is populated with any content. If the field has been populated with content, then the system will determine that an access restriction exists. As an example, referring to FIG. 3, the system may retrieve a document having the template of a paycheck 301. The paycheck's template includes payment amount fields 305, which may be considered sensitive because they may reveal information corresponding to recipient employee's salary. Thus, if the document includes data for one or more of the payment amount fields, the system determines that the document has content that is subject to an access restriction.

As an alternate embodiment, the system may use any now or hereafter known optical character recognition (OCR) methods to identify content and determine whether the content has a format that satisfies a format criterion that corresponds to an access restriction. For example, referring again to FIG. 3, if the content 305 consists of nine numbers and two dashes in the format ###-##-####, the rule may require the system to determine that the content is restricted because it is likely a Social Security Number. Another example may be any content that follows a dollar sign ($) symbol, which may reflect confidential salary or pricing data.

Returning to FIG. 2, if the document includes content that is subject to an access restriction, then the system may determine whether the alternate reviewer is authorized to access the restricted content 213. For example, the system may determine a level of the restriction for the content, and it may determine whether the alternate person holds a role that is permitted to access content at that level. As an example, to access salary information the system's rules may require that the reviewer be a management-level employee, or that the reviewer be associated with a corporate human resources department. Each restriction may be associated with an authorization indicator, such as a sensitivity level or other identifier that the system may store in a memory in association with one or more roles so that the system may compare the reviewer's roles with the authorization indicated to determine whether the reviewer is authorized to access the restricted content.

If the system determines that the alternate reviewer is authorized to access the restricted content, the system may provide that person with access to the document 217, including the restricted content. However, if the system determines that the alternate reviewer is not authorized to access the restricted content, then system will modify the document so that it does not reveal the sensitive information 215, and when making the document available to the alternate reviewer 217 it will only do so in a form that does not reveal the sensitive content. For example, referring again to FIG. 3, the system may redact the sensitive content 305 by redacting it—i.e., removing, masking, or otherwise making it not visible to the alternate reviewer when the document is displayed on a display device. Or, the system may replace the sensitive content with proxy content 303, such as one or more alternate content items having the form—but not the substance—of the sensitive content.

Figure 4:
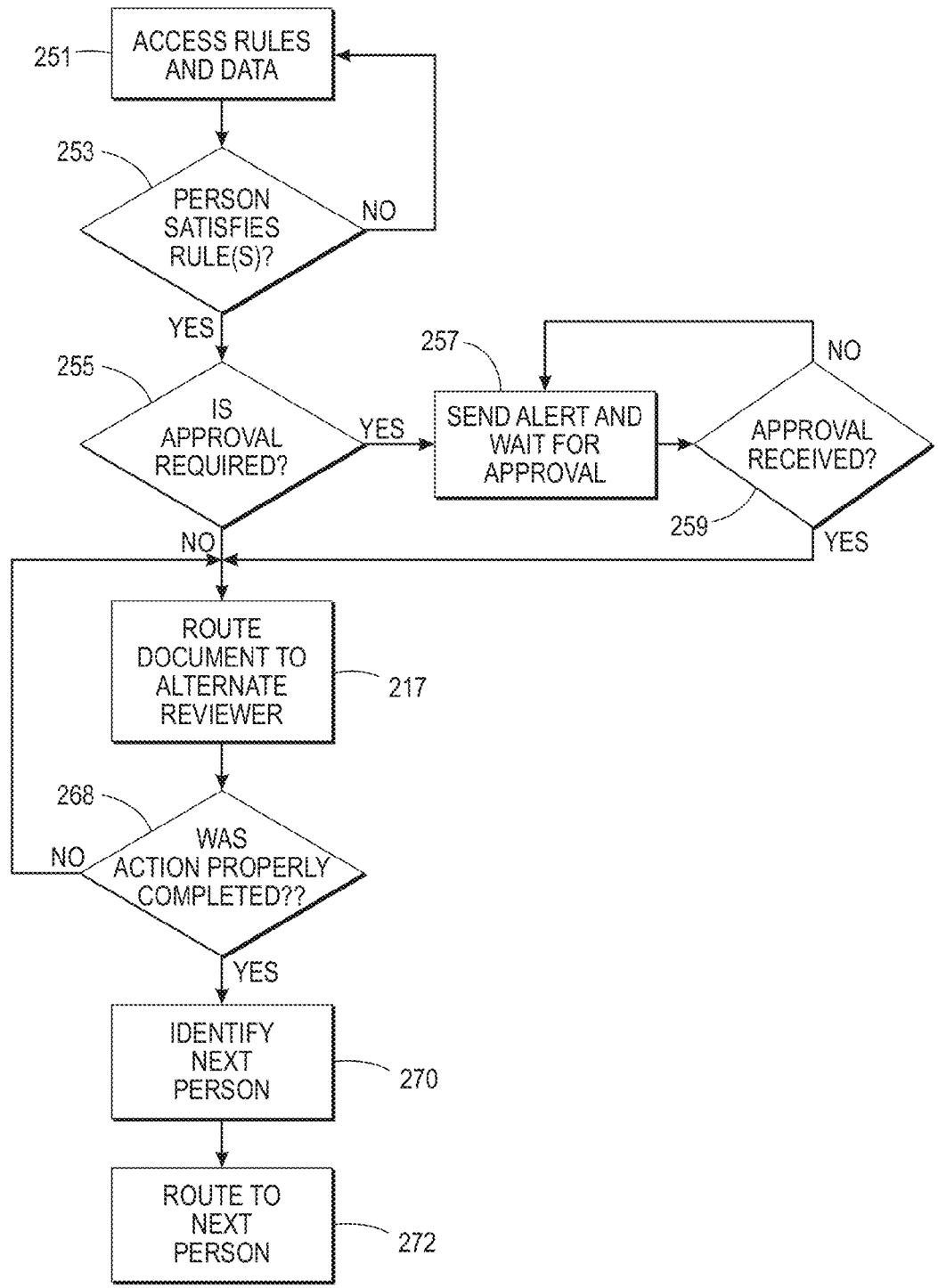
FIG. 4 illustrates several optional steps that the system may implement when transmitting, or determining whether to transmit, a document to an alternate person to perform a workflow action.

FIG. 4 illustrates several optional steps that the system may implement when routing, or determining whether to route, a document to an alternate person to perform a workflow action. To identify an alternate person to perform the workflow action, the system may apply a rule set 251 to data from a table, database or other data structure to identify a person 253 having associated data that corresponds to the rule. For example, the rule may require that the alternate reviewer be a person with whom the document or workflow has been associated, a person having a role that matches or otherwise corresponds to that of the unavailable person, or a person who has been designated as an alternate person for the unavailable person or for the document. If the identified alternate does not satisfy the rule, the system may apply the rules again 253 and select another alternate reviewer.

In some situations, the system may automatically route the document to the alternate person 217 as soon as the restricted content is removed. In other situations, the system may determine whether approval is required 255 from one of the workflow personnel before routing the document to the alternate person. If approval is required, the system may send the alert to the person from whom approval is required 257 and wait for the approver to return an approval before sending the document to the alternate person. If approval is returned, then the system may send the document to the alternate person 217. If disapproval is returned, or if approval is not returned within a threshold period of time, then the system may return the document to the original workflow action person and wait for that person to become available, identify an alternate approver, identify a different alternate reviewer, or simply continue to wait for approval 257.

After the alternate reviewed performs the action, the system may then identify the next workflow action person who is to perform a next workflow action 270. If the next person is not subject to the access restriction, it may then cause the document to be transmitted to the next person in a form that reveals the restricted information 272. For example, before transmitting the document to the alternate person, the system may redact the restricted information from the document and store the redacted information in a memory. The system may then return the redacted information to the document when transmitting it from the alternate person to the next person.

In some embodiments, to confirm that the alternate person has properly performed the action, the system may analyze the document after the alternate person performs the action to determine whether the action was properly completed 268. If may do this by, for example, determining whether all required data entry fields were completed, determining whether data entered satisfied format or other required criteria, or by other analysis methods. If the system determines the action was not properly completed, it may return the document to the alternate person to re-perform the action.

Figure 5:
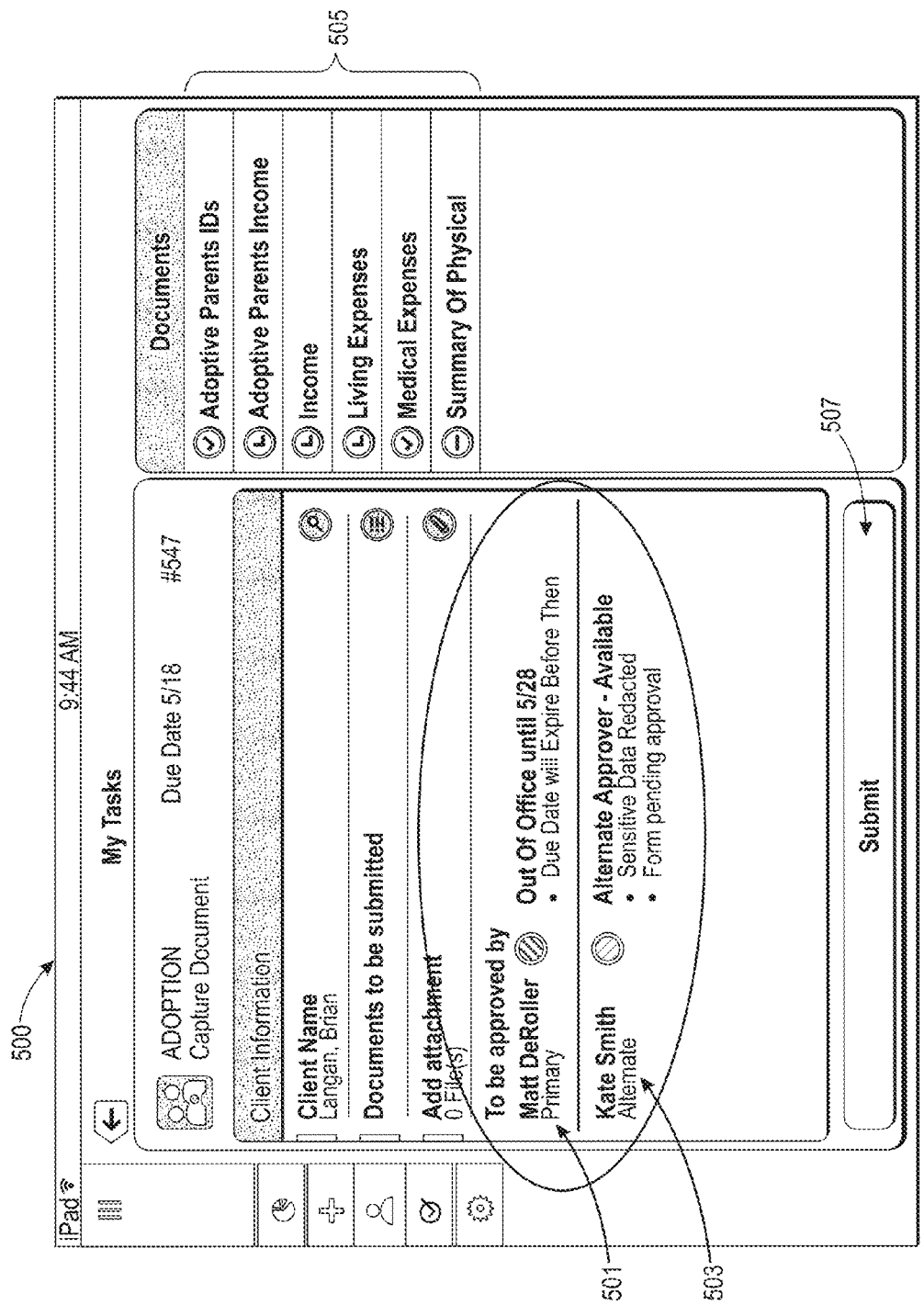
FIG. 5 illustrates an example of a document workflow dashboard.

In some embodiments, the system may generate a user interface that includes a document workflow dashboard that may be viewed by one or more of the workflow action personnel on their electronic devices. FIG. 5 illustrates an example of a document workflow dashboard 500. The dashboard may display information such as an identification of one or more documents 505 that are being processed in a workflow, along with status information about one or more of the documents. For example, in the illustration, a check mark may indicate that the document is complete, a clock symbol may indicate that the document is in process, and a straight line may indicate that processing has not yet begun. Other status indicators may be used. If, for any given document, the next person who is to act on the document is unavailable, the dashboard may display an alert 501 along with an identification of an alternate person 503 who is available to perform the action. The alert 501 may include information such as the source or reason explaining why the person is unavailable, and/or when the person will next be available. The alternate person identifier 503 may display information such as the availability of the alternate person, whether or not the document has been routed to and/or acted upon by the alternate person, a role of the alternate person, whether or not content that is subject to an access restriction has been removed, and one or more applications which the alternate person has available for use. Optionally, the feature of FIG. 5 may be used as an alert that an approver must accept (such as by activating an acceptance input 507) before the document will be sent to the alternate reviewer.

Figure 6:
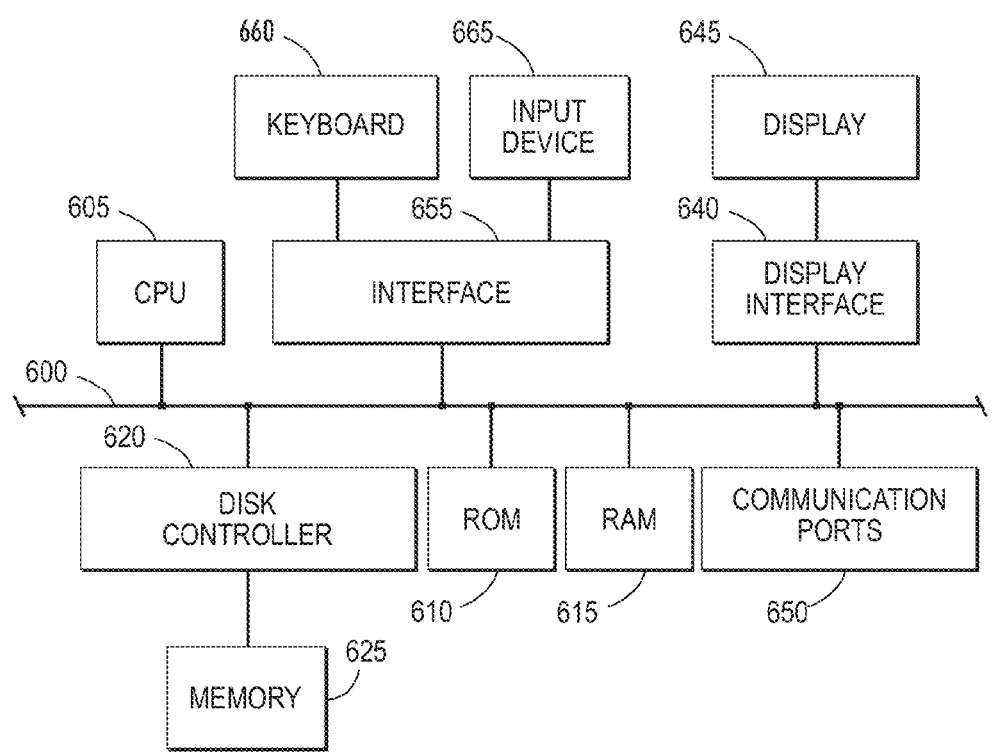
FIG. 6 is a block diagram showing various equipment that may be used to implement various embodiments of the processes described in this document.

FIG. 6 depicts a block diagram of internal hardware that may be used to contain or implement program instructions according to an embodiment. A bus 600 serves as an information highway interconnecting the other illustrated components of the hardware. CPU 605 is the central processing unit of the system, performing calculations and logic operations required to execute a program. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions may be stored in the ROM 610 and/or the RAM 615. Optionally, program instructions may be stored on a tangible computer readable storage medium such as a compact disk, a digital disk, flash memory, a memory card, a USB drive, an optical disc storage medium and/or other recording medium.

An optional display interface 330 may permit information from the bus 600 to be displayed on the display 635 in audio, visual, graphic or alphanumeric format. Communication with external devices may occur using various communication ports 640. An exemplary communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method comprising, by one or more processors:
accessing a document workflow file, wherein the document workflow file represents a document management workflow for a document and comprises:
information identifying a plurality of workflow action personnel,
for each of the personnel, an action that is to be taken, and
a sequence pursuant to which the identified personnel are to take the actions;
monitoring user status information for at least a portion of the workflow action personnel;
determining that a condition exists that requires modifying the sequence by routing the document to an alternate person instead of one of the identified workflow action personnel;
determining whether the document includes any information having an access restriction;
determining whether the access restriction applies to the alternate person; and
if the access restriction applies to the alternate person, modifying the document to yield a modified document that does not reveal the information, and causing the modified document to be routed to the alternate person.

2. The method of claim 1, further comprising, by the one or more processors after causing the modified document to be routed to the alternate person:
selecting, based on the workflow, one of the workflow action personnel who is to perform a next action; and
causing the document, in a form that reveals the information, to be transmitted to the selected person to perform the next action.

3. The method of claim 1, further comprising, by the one or more processors:
receiving an indication that the alternate person has performed the action on the document;
analyzing the document to determine whether the action has been properly completed; and
causing the document to be sent to a next person to perform a next action only if the action has been properly completed, otherwise returning the document to the alternate person for re-performance of the action.

4. The method of claim 1, further comprising, by the one or more processors:
before causing the modified document to be routed to the alternate person, sending an alert to an approver, wherein the alert identifies the alternate person; and
causing the modified document to be routed to the alternate person only after approval is received from the approver.

5. The method of claim 4, wherein the alert also comprises an indicator that the information having the access restriction has been removed from the modified document.

6. The method of claim 1, wherein determining whether the document includes information having an access restriction comprises:
determining, based on a document template, whether the document includes a field for which the template associates the field with the access restriction; and
if so, determining whether the document includes any content for the field.

7. The method of claim 1, wherein determining whether the document includes information having an access restriction comprises:
using optical character recognition to identify content in the document; and
determining whether the identified content has a format that satisfies a format criterion that corresponds to the access restriction.

8. The method of claim 1, wherein modifying the document comprises redacting the information so that the information does not appear in a displayed version of the modified document.

9. A document workflow system comprising:
one or more processors;
a data storage facility; and
one or more computer readable media containing programming instructions that, when executed, are configured to instruct one or more of the processors to:
access the data storage facility to retrieve a document workflow file, wherein the document workflow file represents a document management workflow for a document and comprises:
information identifying a plurality of workflow action personnel, for each of the personnel, an action that is to be taken, and a sequence pursuant to which the identified personnel are to take the actions;

monitor user status information for at least a portion of the workflow action personnel, determine that a condition exists that requires modifying the sequence by routing the document to an alternate person instead of one of the workflow action personnel, determine whether the document includes any information having an access restriction;

determine whether the access restriction applies to the alternate person; and if the access restriction applies to the role, modify the document to yield a modified document that does not reveal the information, and cause the modified document to be routed to the alternate person for the first workflow action.

10. The system of claim 9, further comprising programming instructions that, when executed, are configured to instruct the one or more processors to:

select, based on the workflow, one of the workflow action personnel who is to perform a next action; and cause the document, in a form that reveals the information, to be transmitted to the selected person to perform the next action.

11. The system of claim 9, further comprising programming instructions that, when executed, are configured to instruct the one or more processors to:

receive an indication that the alternate person has performed the action on the document;

analyze the document to determine whether the action has been properly completed; and cause the document to be sent to a next person to perform a next action only if the action has been properly completed, otherwise returning the document to the alternate person for re-performance of the action.

12. The system of claim 9, further comprising programming instructions that, when executed, are configured to instruct the one or more processors to:

before causing the modified document to be routed to the alternate person, send an alert to an approver, wherein the alert identifies the alternate person; and cause the modified document to be routed to the alternate person only after approval is received from the approver.

13. The system of claim 9, wherein the alert also comprises an indicator that the information having the access restriction has been removed from the modified document.

14. The system of claim 9, wherein the instructions for determining whether the document includes information having an access restriction comprise instructions to:

determine, based on a document template, whether the document includes a field for which the template associates the field with the access restriction; and if so, determine whether the document includes any content for the field.

15. The system of claim 9, wherein the instructions for determining whether the document includes information having an access restriction comprise instructions to:

use optical character recognition to identify content in the document; and determine whether the identified content has a format that satisfies a format criterion that corresponds to the access restriction.

16. The system of claim 9, wherein the instructions for modifying the document comprise instructions to redact the information so that the information does not appear in a displayed version of the modified document.

17. A method comprising, by one or more processors:

accessing a document workflow file, wherein the document workflow file represents a document management workflow for a document and comprises:

information identifying a plurality of workflow action personnel, for each of the personnel, an action that is to be taken, and a sequence pursuant to which the identified personnel are to take the actions;

monitoring user status information for at least a portion of the workflow action personnel;

determining that a condition exists that requires modifying the sequence by routing the document to an alternate person instead of one of the identified workflow action personnel;

determining whether the document includes any information having an access restriction;

determining whether the access restriction applies to the alternate person;

if the access restriction applies to the alternate person, sending an alert to an approver; and after receiving an approval from the approver, redacting the document to yield a modified document that does not reveal the information, and causing the modified document to be routed to the alternate person.

18. The method of claim 17, further comprising, by the one or more processors after causing the modified document to be routed to the alternate person:

selecting, based on the workflow, one of the workflow action personnel who is to perform a next action; and causing the document, in a form that reveals the information, to be transmitted to the selected person to perform the next action.

19. The method of claim 17 further comprising, by the one or more processors:

receiving an indication that the alternate person has performed the action on the document;

analyzing the document to determine whether the action has been properly completed; and if the action has been properly completed, causing the document to be sent to a next person, otherwise returning the document to the alternate person for re-performance of the action.

20. The method of claim 19, wherein:

analyzing the document determines that the action has been properly completed; and causing the modified document to be sent to the next person comprises determining whether the next person is also subject to the access restriction, and if the next person is subject to the access restriction sending the document without the information returned to the document, and if the next person is not subject to the access restriction sending the document with the information returned to the document.

* * * * *